(No Model.)

J. H. SCHAEFER.
MEAT MIXING MACHINE.

No. 523,646. Patented July 24, 1894.

WITNESSES:—
L. Ismy Van Horn.
Chas. B. Mann Jr.

INVENTOR:—
J. H. Schaefer
By Chas. B. Mann
ATTORNEY.

UNITED STATES PATENT OFFICE.

JOHN H. SCHAEFER, OF BALTIMORE, MARYLAND, ASSIGNOR TO GEORGE N. SCHAEFER AND JOHN H. SCHAEFER, JR., OF SAME PLACE.

MEAT-MIXING MACHINE.

SPECIFICATION forming part of Letters Patent No. 523,646, dated July 24, 1894.

Application filed December 4, 1893. Serial No. 492,793. (No model.)

*To all whom it may concern:*

Be it known that I, JOHN H. SCHAEFER, a citizen of the United States, residing at Baltimore, in the State of Maryland, have invented certain new and useful Improvements in Meat-Mixing Machines, of which the following is a specification.

This invention relates to a meat-mixing machine for mixing minced meat to be used for any purpose, such as for making sausages, &c.

The object is to provide improved mechanism to quickly, thoroughly and uniformly mix the meat and leave the product in a light and spongy condition.

Figure 1:
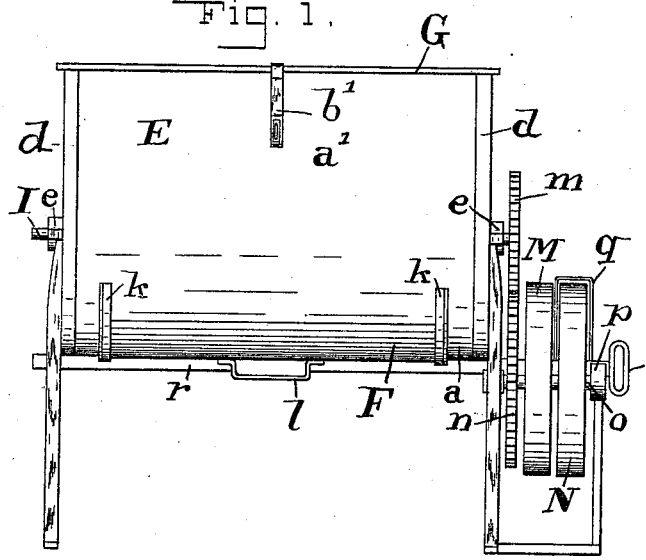
Figure 2:
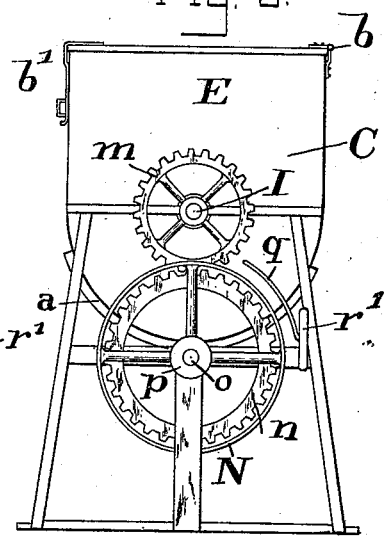
Figure 3:
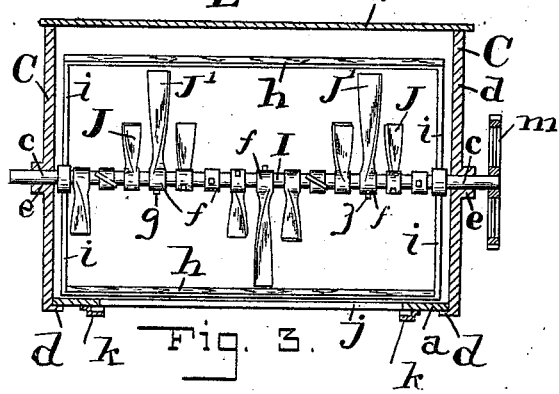
Figure 4:
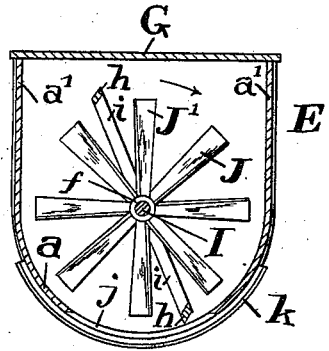
Figure 5:
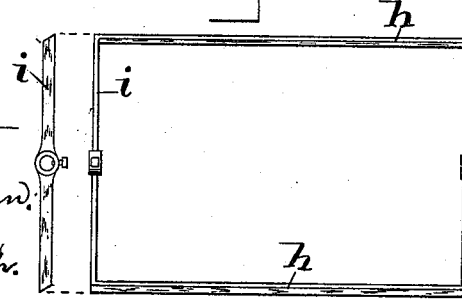

Figure 1 is a side elevation of the machine. Fig. 2 is an end view of the same. Fig. 3 is vertical longitudinal section of the case and internal mechanism. Fig. 4 is a vertical cross-section of the case and internal mechanism. Fig. 5 is a view of the revoluble frame.

The case, E, has a rounded concave bottom, $a$, and vertical side walls, $a'$, and a cover, G, closes over the top, being secured by hinges, $b$, at one side and fastened by a hasp, $b'$, at the other side. Each end, C, of the case has a flange, $d$, which takes outside of the bottom and side walls; the ends also have a bearing, $e$, for the journals, $c$, of the shaft, I, which extends through the case; propeller-shaped blades have at one end a collar or head, $f$, which slides on the shaft, I, and each head is provided with one or more set-screws, $g$, by which it is made fast on the shaft. The broad end of each blade is set at an angle or inclination with respect to the shaft, and there are two forms of said blades—rights and lefts—that is, one form, J, of the blades has ends which incline to the right and the other blades, J', ends which incline to the left, and these rights and lefts adjoin each other on the shaft, that is to say, every other blade, J, has a right incline and the alternate or intermediate blades J', have a left incline—in other words, adjoining blades have their ends inclined in an opposite direction. The effect of this particular construction and arrangement is found to be advantageous, in that when the shaft, I, revolves one of the right-inclined blades, J, strikes the minced meat and forces it partly in the direction of the revolution and at the same time also forces it partly toward the left-hand end of the case, where it will be in the path of the next adjoining left-inclined blade, J', which then forces the same meat partly in the direction of the revolution and also partly back again toward the right-hand of the case where it will again be in the path of the next adjoining blade, J. It will be seen that throughout the length of the case these alternating right and left-inclined blades, in numerous places, are throwing the chopped or minced meat first in one direction and then back again in the opposite direction, and thereby produce a peculiar movement of the meat.

Two longitudinal bars, $h$, within the case extend the entire length thereof, and are mounted on arms so as to revolve close to the rounded concavity of the bottom. The arms, $i$, on which the bars, $h$, are mounted, are fixed rigidly on the shaft, I,—one arm at each end of the shaft and in proximity to the vertical end-walls, C. The two vertical arms, $i$, and the horizontal bars, $h$, together form a rectangular frame which revolves. The two bars, $h$, pass through the bulk of chopped or minced meat as it lies upon the concave bottom, and lighten it up and prevent it from adhering to the bottom and becoming compacted thereon. These bars, $h$, also have the effect to tumble the minced meat in a very different manner from the propeller blades, J, J², and they co-act with said blades in effecting a thorough admixture of the chopped or minced meat. The arms, $i$, revolve sufficiently close to the vertical end walls to act on any meat that may lodge against the walls and remove the meat therefrom and force it into a position where the blades or bars will act on it.

The bottom, $a$, of the case has an opening, $j$, and at each end of said opening is a curved slideway, $k$, in which an outlet door, F, slides. This slide door has a handle, $l$. One end of the shaft, I, which projects through the end wall, C, has a gear wheel, $m$, mounted on it which is driven by another gear wheel, $n$, mounted on a short shaft, $o$, supported in bearings, $p$. The short shaft carries a fast pulley, M, and a loose pulley, N; a belt-shifter comprises a loop, q, mounted on a sliding rod, r, which has a loop or hand-grasp, r'.

A belt (not shown) will drive the pulley, M, and through the gearing, n, m, will revolve the shaft, I, the propeller blades, and the bars, h. The gearing as here shown serves to increase the speed of revolution of the shaft, I, but this gearing may be dispensed with and the shaft, I, may have mounted on it the pulley, M, and thus be driven direct.

From this description the operation of the machine will be readily understood.

It is obvious that certain features of the construction herein described may be changed or varied in the machine without affecting the scope of this patent.

The longitudinal bars, h, of the revoluble frame may be straight, as shown, or they may be curved.

Having thus described my invention, what I claim as new, and desire to secure by Letters Patent, is—

In a meat-mixing machine, the combination of the case; a revoluble shaft extending longitudinally through the case; propeller-shaped blades of two different forms,—one form, J, having an end which inclines to the right-hand and the other form, J', an end which inclines to the left-hand,—and mounted on the shaft so that a right-hand blade adjoins a left-hand blade, and these two forms of blades alternate along the shaft; and a rectangular frame co-acting with the said blades and comprising radial arms, i, which are mounted on the said shaft next to the end-walls of the case, and longitudinal bars, h, connecting the ends of the radial arms so that in the revolution of the rectangular frame the longitudinal bars pass close to the bottom of the case and remove therefrom the meat and force it in the path of the said revolving blades.

In testimony whereof I affix my signature in the presence of two witnesses.

JOHN H. SCHAEFER.

Witnesses:
CHARLES B. MANN, Jr.,
C. C. HINES.